(12) United States Patent
Honbo et al.

(10) Patent No.: US 6,992,800 B2
(45) Date of Patent: Jan. 31, 2006

(54) IMAGE READING APPARATUS AND METHOD OF SETTING READING POSITION

(75) Inventors: Tsunao Honbo, Kanagawa (JP); Katsuhiro Ishido, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 924 days.

(21) Appl. No.: 10/005,048

(22) Filed: Dec. 3, 2001

(65) Prior Publication Data
US 2002/0080429 A1 Jun. 27, 2002

(30) Foreign Application Priority Data
Dec. 7, 2000 (JP) ............................ 2000-373408

(51) Int. Cl.
H04N 1/40 (2006.01)
H04N 1/04 (2006.01)
H04N 1/38 (2006.01)

(52) U.S. Cl. ............... 358/461; 358/464; 358/496; 358/497; 358/498

(58) Field of Classification Search ............... 358/496, 358/461, 464, 497, 498, 474
See application file for complete search history.

(56) References Cited

U.S. PATENT DOCUMENTS

| | | | | |
|---|---|---|---|---|
| 5,245,440 A | * | 9/1993 | Sato | 358/406 |
| 5,289,000 A | | 2/1994 | Toyofuku | 250/234 |
| 5,864,408 A | * | 1/1999 | Kumashiro | 358/461 |

FOREIGN PATENT DOCUMENTS

| | | |
|---|---|---|
| JP | 03-107275 | 5/1991 |
| JP | 06-046212 | 2/1994 |
| JP | 06-178054 | 6/1994 |
| JP | 09-107439 | 4/1997 |
| JP | 11-220625 | 8/1999 |

OTHER PUBLICATIONS

Japanese Patent Office Office Action dated Jun. 10, 2005 corresponding to JPA 2000-373408.
English Language Abstract for 06-178054.
English Language Abstract for 03-107275.
English Language Abstract for 06-046212.
English Language Abstract for 11-220625.
English Language Abstract for 09-107439.

* cited by examiner

Primary Examiner—Edward Coles
Assistant Examiner—Houshang Safaipour
(74) Attorney, Agent, or Firm—Morgan & Finnegan, LLP

(57) ABSTRACT

Disclosed is an image reading apparatus for moving a document reading unit to a point below a document feeder that feeds documents, and emitting light from a light source of the document reading unit toward a feed roller of the document feeder, whereby light reflected from a document that travels between the feed roller and the light source is sensed by the document feeding unit to thereby read an image on the document. The apparatus includes a photoelectronic converter for outputting an electric signal that conforms to amount of incident light, and a reading position setting unit for moving the document reading unit, irradiating the feed roller with light from the light source at each position to which the document reading unit is moved, causing the photoelectronic converter to output an electric signal that conforms to amount of light reflected from the feed roller at each position, detecting a range in a sub-scan direction over which this electric signal exceeds a predetermined threshold value, and setting a position at the center of this range as a reading position.

34 Claims, 7 Drawing Sheets

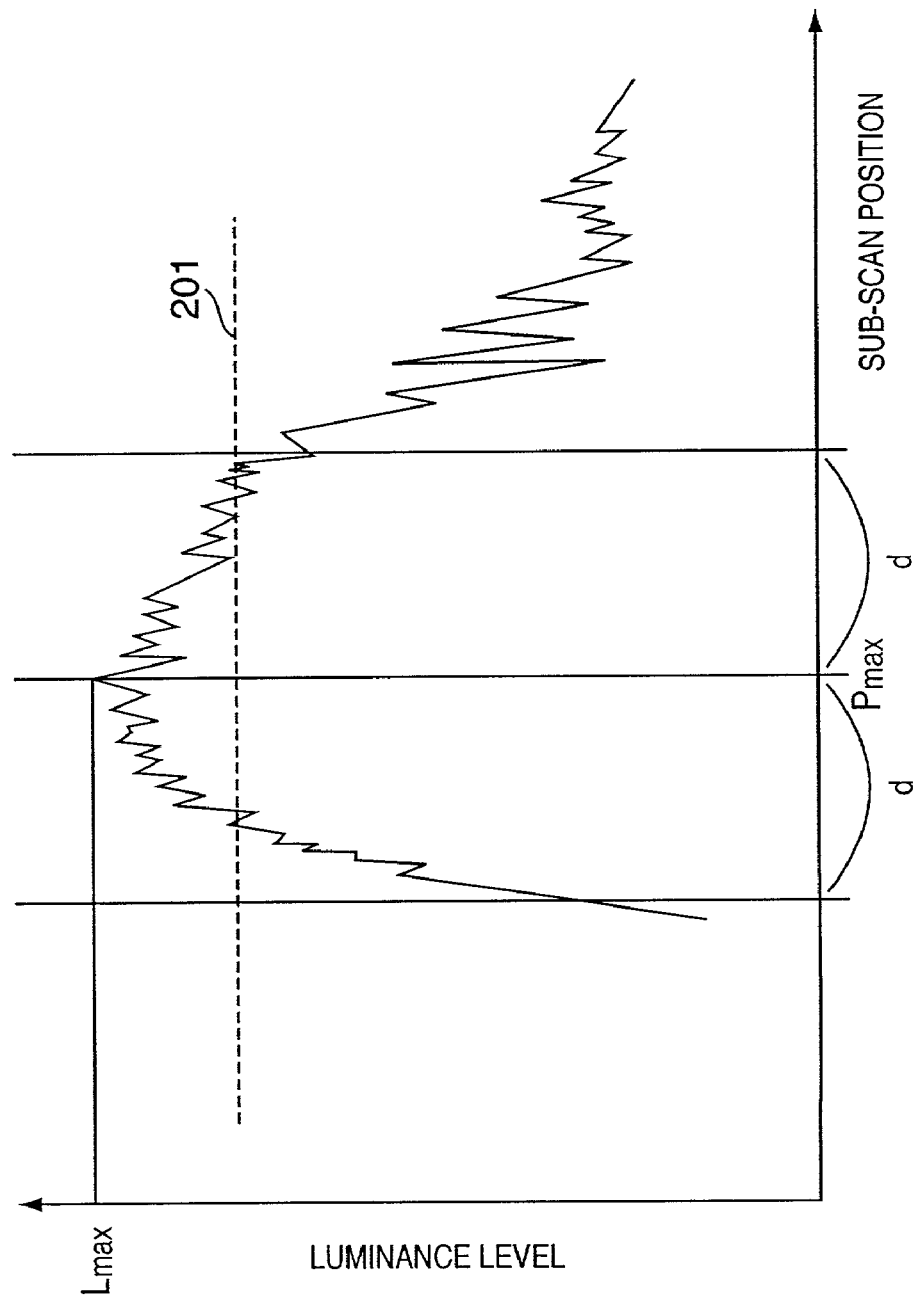

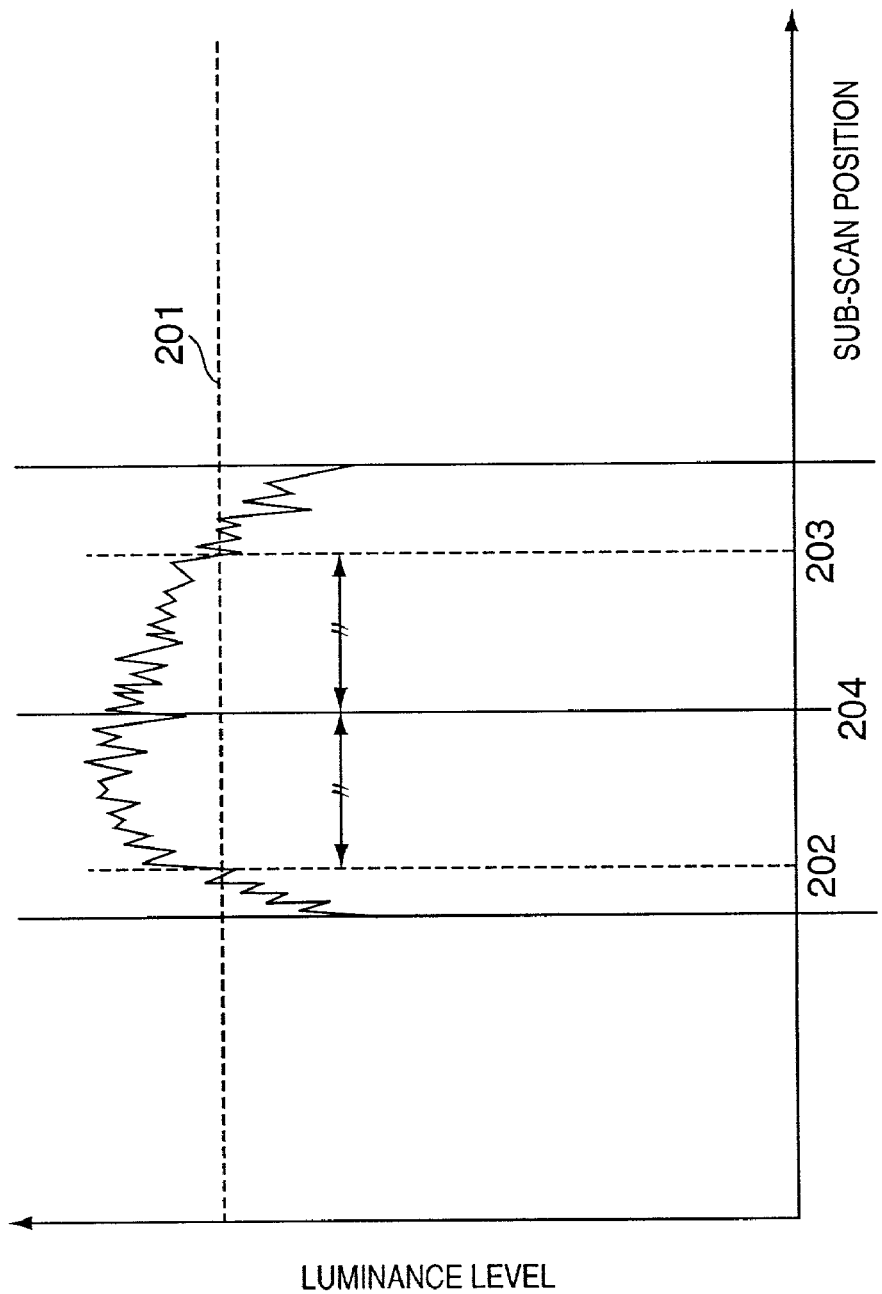

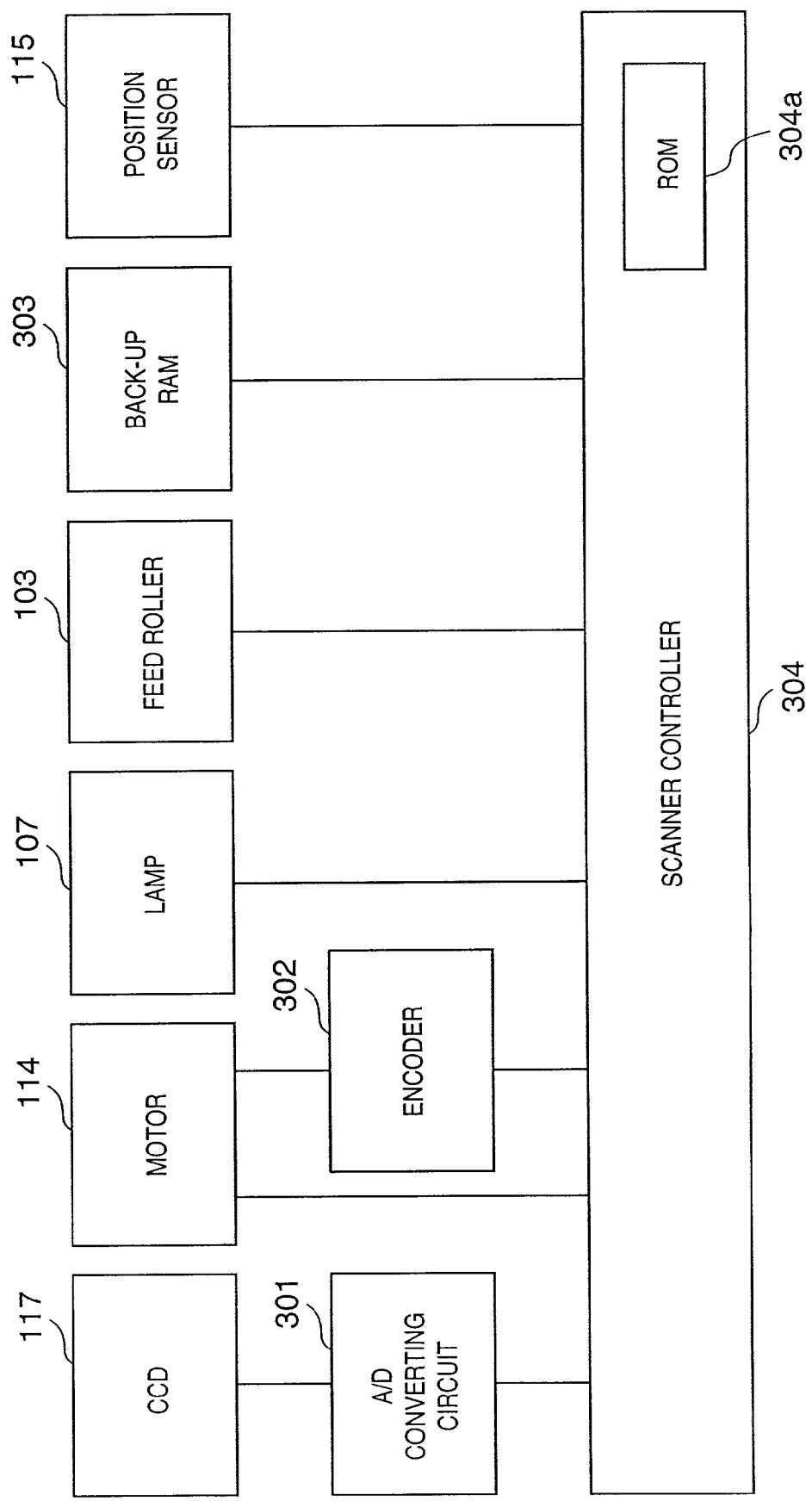

IMAGE READING APPARATUS AND METHOD OF SETTING READING POSITION

FIELD OF THE INVENTION

This invention relates to an image reading apparatus having an automatic document feeder and to a method of setting reading position in this image reading apparatus. More particularly, the invention relates a method of setting reading position in an image reading apparatus in a case where a reading operation is performed while feeding a document using an automatic document feeder.

BACKGROUND OF THE INVENTION

Conventional digital copiers include those equipped with a document feeder such as an automatic document feeder (referred to as an ADF below) capable of dealing with double-sided copying.

When a document that has been supplied to the ADF is copied in a digital copier having an ADF of this kind, a reading unit provided below the ADF is moved by a motor and stopped at a set position, namely a point substantially directly beneath a platen roller within the ADF, after which light is emitted from a lamp unit and the document transported between the platen roller and a glass plate to thereby scan the document with the light so that light reflected from the document may be detected by the reading unit. A plurality of images are obtained by executing processing in a printer section based upon data obtained by such detection.

When the reading unit provided below the ADF is moved to the set position by the motor in the conventional arrangement described above, the motor is stopped at such time that a predetermined number of pulses have been counted starting from the moment at which a position sensor senses the reading unit, and the stopping position is adopted as being the reading position. A problem which arises is that the precision of the reading apparatus declines (on the order of about ±2 mm), causing a decline in image quality at reading of the document, owing to differences in the mounting position of the ADF or a variance in the reading position of the ADF relative to the position of the reading unit.

The specification of Japanese Patent No. 2993810 proposes means for solving this problem, namely means for moving a reader in a sub-scan direction and, while the reader is being moved, adopting as the reading position a position that maximizes a value obtained by reading light entrant upon being reflected from the platen roller.

However, it has been found that as a result of reading reflected light from the platen roller using the reader, there are instances where a plurality of positions that give maximum values exist owing to the diameter and surface conditions of the platen.

Further, the actual path traversed by a document varies depending upon document thickness. In addition, with regard to documents having a glossy surface, there are instances where the value obtained by reading reflected light from the platen roller while the reader is being moved in the sub-scan direction is not necessarily the optimum reading position.

SUMMARY OF THE INVENTION

The present invention has been made in consideration of the circumstances set forth above and its object is to suppress a decline in image quality at reading of a document by improving the reading position precision of the reading apparatus.

According to the present invention, the foregoing object is attained by providing an image reading apparatus for moving a document reading unit to a point below a document feeder that feeds documents, and emitting light from a light source of the document reading unit toward a feed roller of the document feeder, whereby light reflected from a document that travels between the feed roller and the light source is sensed by the document reading unit to thereby read an image on the document, the apparatus comprising: a photoelectronic converter for outputting an electric signal that conforms to amount of incident light; and a reading position setting unit adapted to move the document reading unit, irradiate the feed roller with light from the light source at each position to which the document reading unit is moved, cause the photoelectronic converter to output an electric signal that conforms to amount of light reflected from the feed roller at each position, detect a range in a sub-scan direction over which this electric signal exceeds a predetermined threshold value, and set a position at the center of this range as a reading position.

According to the present invention, the foregoing object is also attained by providing a reading position setting method in an image reading apparatus for moving a document reading unit to a point below a document feeder that feeds documents, and emitting light from a light source of the document reading unit toward a feed roller of the document feeder, whereby light reflected from a document that travels between the feed roller and the light source is converted to an electric signal by a photoelectronic converter to thereby read an image on the document, the method comprising: a read-out step of moving the document reading unit, irradiating the feed roller with light from the light source at each position to which the document reading unit is moved and causing the photoelectronic converter to output an electric signal that conforms to amount of light reflected from the feed roller at each position; a detection step of detecting a range in a sub-scan direction over which the electric signal exceeds a predetermined threshold value; and a setting step of setting a position at the center of the range, which has been detected at the detection step, as a reading position.

Further, the foregoing object is also attained by providing an image reading apparatus for moving a document reading unit to a point below a document feeder that feeds documents, and emitting light from a light source of the document reading unit toward a feed roller of the document feeder, whereby light reflected from a document that travels between the feed roller and the light source is sensed by the document reading unit to thereby read an image on the document, the apparatus comprising: a photoelectronic converter for outputting an electric signal that conforms to amount of incident light; and a reading position setting unit adapted to move the document reading unit, irradiating the feed roller with light from the light source at each position to which the document reading unit is moved, cause the photoelectronic converter to output an electric signal that conforms to amount of light reflected from the feed roller at each position, detect a range in a sub-scan direction over which this electric signal exceeds a predetermined threshold value, detect a flat portion of the read signal within this range, and set the center of the detected flat portion as a reading position.

Further, the foregoing object is also attained by providing a reading position setting method in an image reading apparatus for moving a document reading unit to a point below a document feeder that feeds documents, and emitting light from a light source of the document reading unit toward a feed roller of the document feeder, whereby light reflected from a document that travels between the feed roller and the light source is converted to an electric signal by a photo-electronic converter to thereby read an image on the document, the method comprising: a read-out step of moving the document reading unit, irradiating the feed roller with light from the light source at each position to which the document reading unit is moved and causing the photoelectronic converter to output an electric signal that conforms to amount of light reflected from the feed roller at each position; a first detection step of detecting a range in a sub-scan direction over which the electric signal exceeds a predetermined threshold value; a second detection step of detecting a flat portion of the read signal within the range detected at the first detection step; and a setting step of setting the center of the flat portion, which has been detected at the second detection step, as a reading position.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 2A is a diagram for explaining a reading position according to the first embodiment of the present invention;

FIG. 2B is a diagram for explaining a reading position according to the first embodiment of the present invention;

FIG. 3 is a block diagram illustrating the general structure of the control system of the image reading apparatus according to the first embodiment of the present invention;

DESCRIPTION OF THE PREFERRED EMBODIMENTS

Preferred embodiments of the present invention will be described in detail in accordance with the accompanying drawings.

(First Embodiment)

Figure 1:
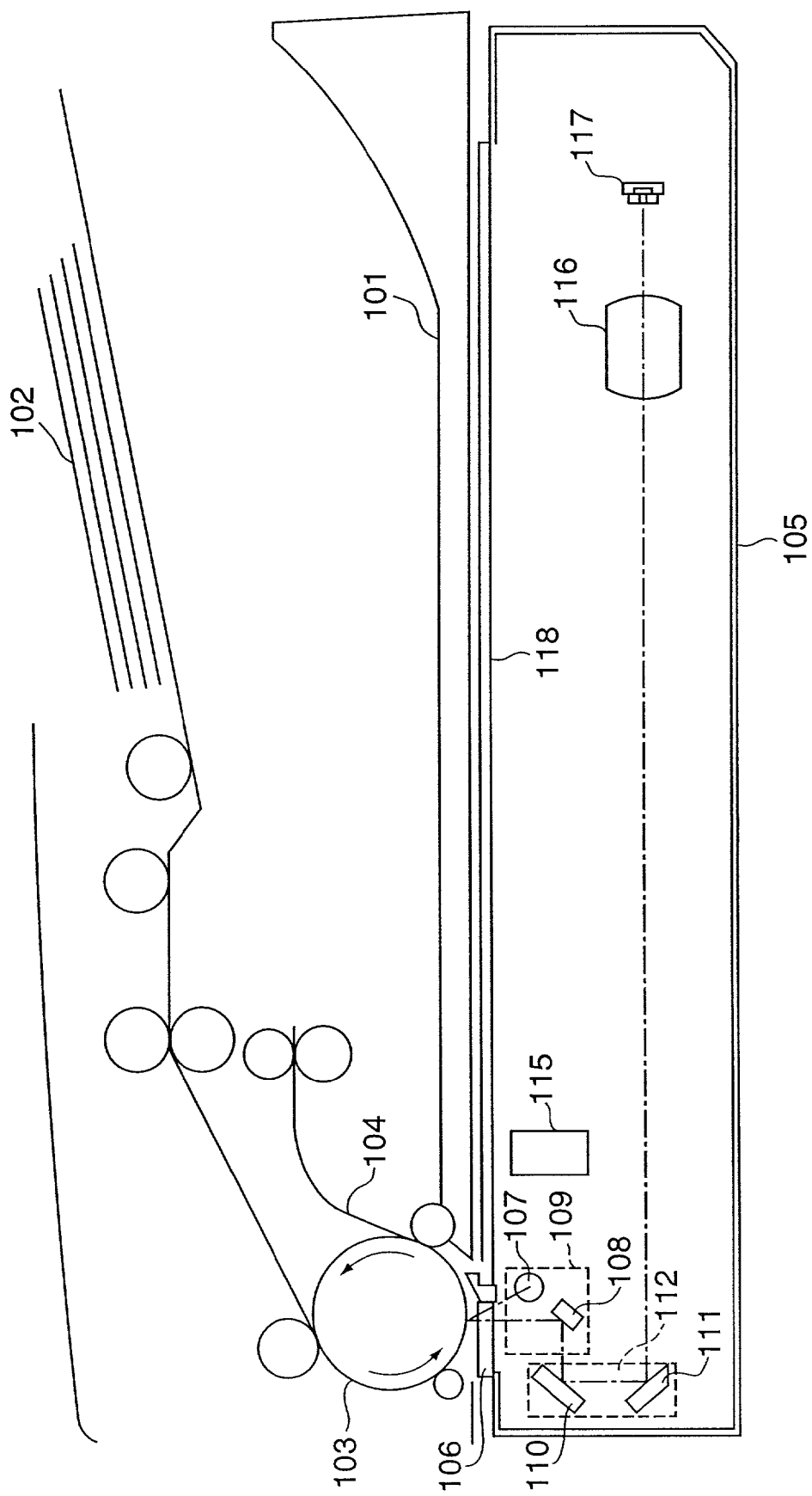
FIG. 1 is a sectional view illustrating the general structure of an image reading apparatus according to a first embodiment of the present invention.

FIG. 1 is a sectional view illustrating the general structure of an image reading apparatus according to a first embodiment of the present invention. The image reading apparatus includes a scanner 105 proper and an ADF 101 adapted so as to be removably mounted on the scanner 105.

The ADF 101 transports placed documents 102 to, and recovers them from, a platen glass 106 of the scanner 105 by a feed roller 103. At this time the documents 102 pass between the feed roller 103, which is mounted on the ADF 101, and the platen glass 106 of the scanner 105. During this passage of the documents, they are scanned optically by the scanner 105 so that the information on the documents is read.

More specifically, the scanner 105 has a lamp 107 for illuminating the document surface with light, and mirrors 108, 110, 111 for introducing reflected light from the document, which light corresponds to that emitted by the lamp 107, to a lens 116 and CCD 117. The lamp 107 and the mirror 108 are mounted on a first optical bench 109, and the mirrors 110, 111 are mounted on a second optical bench 112.

The first and second benches 109, 112 are coupled to a motor 114 (see FIG. 3) by a wire (not shown) and are controlled so as to travel parallel to a platen glass 118 by driving the motor 114 into rotation.

A position sensor 115 senses the home position of the first optical bench 109. By rotating the motor 114 in forward and reverse directions using the position of the position sensor 115 as a reference, the optical benches 109, 112 can be moved to optically scan the document on the platen glass 118.

The motor 114 is constituted by a stepping motor. An encoder 302 (see FIG. 3) is connected to the motor 114 and outputs a signal by which it is possible to recognize how many pulses the first and second benches 109, 112 have been moved. That is, it is possible to ascertain the positions of the optical benches 109, 112 by the pulses output from the encoder 302.

Light reflected from the document is introduced to the lens 116 via the mirrors 108, 110, 111 and is condensed on the CCD 117 by the lens 116. The CCD 117 photoelectronically converts the reflected light, in which the document information is contained, and outputs an electrical image signal.

The image reading apparatus of the first embodiment constructed as set forth above is capable of reading document information in two modes, namely "an ADF document reading mode" and "a platen glass document reading mode". In the ADF document reading mode, document information is read while the document is fed by the ADF 101 in a state in which the first optical bench 109 is stopped at the document reading position. In the platen glass document reading mode, a document is fixedly placed on the platen glass 118 and the document information is read while the optical benches 109, 112 are moved in the sub-scan direction.

FIG. 3 is a block diagram illustrating the general structure of the control system of this image reading apparatus, in which components identical with those shown in FIG. 1 are designated by like reference characters. The image reading apparatus shown in FIG. 1 includes the feed roller 103 mounted on the ADF 101 for feeding documents 102; the lamp 107 for illuminating the surface of a document with light; the motor 114 for scanning the document by moving the first and second optical benches 109, 112 in the sub-scan direction; the CCD 117 for photoelectronically converting light reflected from the document surface; an A/D converting circuit 301 for converting the analog output signal of the CCD 117 to a digital signal; the encoder 302 connected to the motor 114; the position sensor 115 for positioning the first optical bench 109 at the home position; a back-up RAM 303 for setting a normal document reading position in the ADF document reading mode; and a scanner controller 304.

The scanner controller 304 includes a ROM 304a in which have been stored various programs such as a program corresponding to the flowchart shown in FIG. 4, described later.

The scanner controller 304 ascertains the position of the first and second optical benches 109, 112 based upon the output of the encoder 302 and the output signal from the position sensor 115, adjusts the reading position by a method, described below, based upon the output of the CCD 117 digitized by the A/D converting circuit 301, and saves the set position in the back-up RAM 303.

This operation for sensing and setting the document reading position may be performed when the ADF 101 is mounted on the scanner 105, whenever the reading operation in the ADF document reading mode is designated by the operator, or when power is introduced to the image reading apparatus.

In any case, documents can be read at high speed because the sensing and setting of document reading position is not carried out prior to the reading of each document whenever documents are read one after another. It is preferred that the timing for sensing and setting the document reading position be selectable by the operator at will.

It is also possible to sense and set the document reading position at any timing by operating a prescribed key, for example. This configuration is particularly effective in a case where the mechanism connecting the ADF 101 and scanner 105 is such that the ADF 101 and scanner 105 may readily experience a deviation in position when the ADF 101 is touched by one's hand.

Processing for sensing and setting the image reading position will now be described with reference to the flowchart of FIG. 4.

In accordance with the program that has been stored in the ROM 304a, the scanner controller 304 first drives and controls the motor 114 at step S1 to thereby move the first and second optical benches 109, 112 by a pre-set number of pulses from the home position along the platen glass 106. The amount of movement at this time is set in such a manner that the first optical bench 109 will be situated substantially directly below the center position of the feed roller 103.

Next, the scanner controller 304 lights the lamp 107 at step S2 and drives the motor 114 at step S3. As a result, while the first and second optical benches 109, 112 are moved over a prescribed range in the sub-scan direction about this point, electric charge is read out of the CCD 117 and is converted to a digital signal by the A/D converting circuit 301. Next, at step S4, a position Pmax, which indicates the maximum value of the digital signal obtained over this prescribed range, and the maximum value Lmax are detected and stored. FIG. 2A illustrates an example of the read signal in the sub-scan direction read at this time.

It is determined at step S5 whether the detected maximum value Lmax is greater than a predetermined value k. If Lmax is equal to or less than k ("NO" at step S5), then an error message is displayed on the display unit of a control panel (not shown) at step S6 and operation is halted. The reason for this is to take into account a situation where the feed roller 103 does not reside within the prescribed range with respect to the scanner 105 or floats above the platen glass 106 owing to an improper positional relationship between the ADF 101 and scanner 105.

If the maximum value Lmax is greater than the predetermined value k ("YES" at step S5), then a value obtained by multiplying the detected maximum value Lmax by a predetermined coefficient is set as a threshold value 201 (FIG. 2A) at step S7.

Next, at step S8, the scanner controller 304 drives the motor 114, whereby the first and second optical benches 109, 112 are moved to the position Pmax stored at step S4 and indicating the maximum value of the digital signal.

Next, at step S9, the scanner controller 304 lights the lamp 107 and drives the motor 114 to thereby move the first and second optical benches 109, 112 back-and-forth in the sub-scan direction over a prescribed range (2*d*) about the position Pmax as center. FIG. 2B illustrates the read value output from the CCD 117 and converted to the digital signal by the A/D converting circuit 301 at this time. The read value and the threshold value 201 are compared and sub-scan positions (two locations) 202, 203 (FIG. 2B) at which the read value falls below the threshold value 201 are stored in the back-up RAM 303 at step S10. It has been determined in investigations concerning this case that similar image quality is obtained at positions where a read-signal level above a predetermined threshold value can be detected.

As shown in FIG. 2B, the point midway between the two sub-scan positions 202, 203 at which the read value falls below the threshold value is stored in the back-up RAM 303 as the reading position. However, if the distance between the two sub-scan positions 202, 203 is found to be equal to or less than a predetermined value ("NO" at step S12), then an error message is displayed on the display unit of the control panel (not shown) and operation is halted at step S11.

If the distance between the two sub-scan positions 202, 203 is found to be greater than the predetermined value ("YES" at step S12), then the point 204 midway between the two locations 202, 203 is set as the reading position at step S13.

In accordance with the first embodiment, as described above, a decline in image quality when a document is read can be suppressed by improving the precision of the reading position of the reading apparatus.

In the description rendered above, the amount of movement is set in such a manner that the first optical bench 109 will arrive substantially directly below the center position of the feed roller 103 at step S1, and the first and second optical benches 109, 112 are moved over a prescribed range in the sub-scan direction centered on this position at step S3. However, the present invention is not limited to this arrangement. It may be so arranged that the amount of movement is set in such a manner that the first optical bench 109 will arrive at one end of the prescribed range at step S1, after which the first optical bench 109 is moved from this point to the other end of the prescribed range. Similarly, the first optical bench 109 is moved to the position Pmax, which indicates the maximum value, at step S8. However, control may be exercised so as to move the first optical bench 109 to one end (Pmax+d or Pmax−d) of a prescribed range (2d) centered on the position Pmax, and then move the first optical bench 109 over the prescribed range.

Further, with regard to the center position of the feed roller 103 or either end of the prescribed range in step S1, a fixed amount of movement may be stored in the ROM 304a or back-up RAM 303 as a default value, and the amount of movement may be found based upon a center position obtained by processing for detecting the document reading position the preceding time.

Furthermore, in the first embodiment, a case is described in which the reading of the feed roller 103 is performed twice. However, the present invention is not limited to this arrangement. It is obvious that setting of the reading position based upon a signal value obtained by a single reading operation also can readily be executed based upon the first embodiment.

(Second Embodiment)

Figure 5:
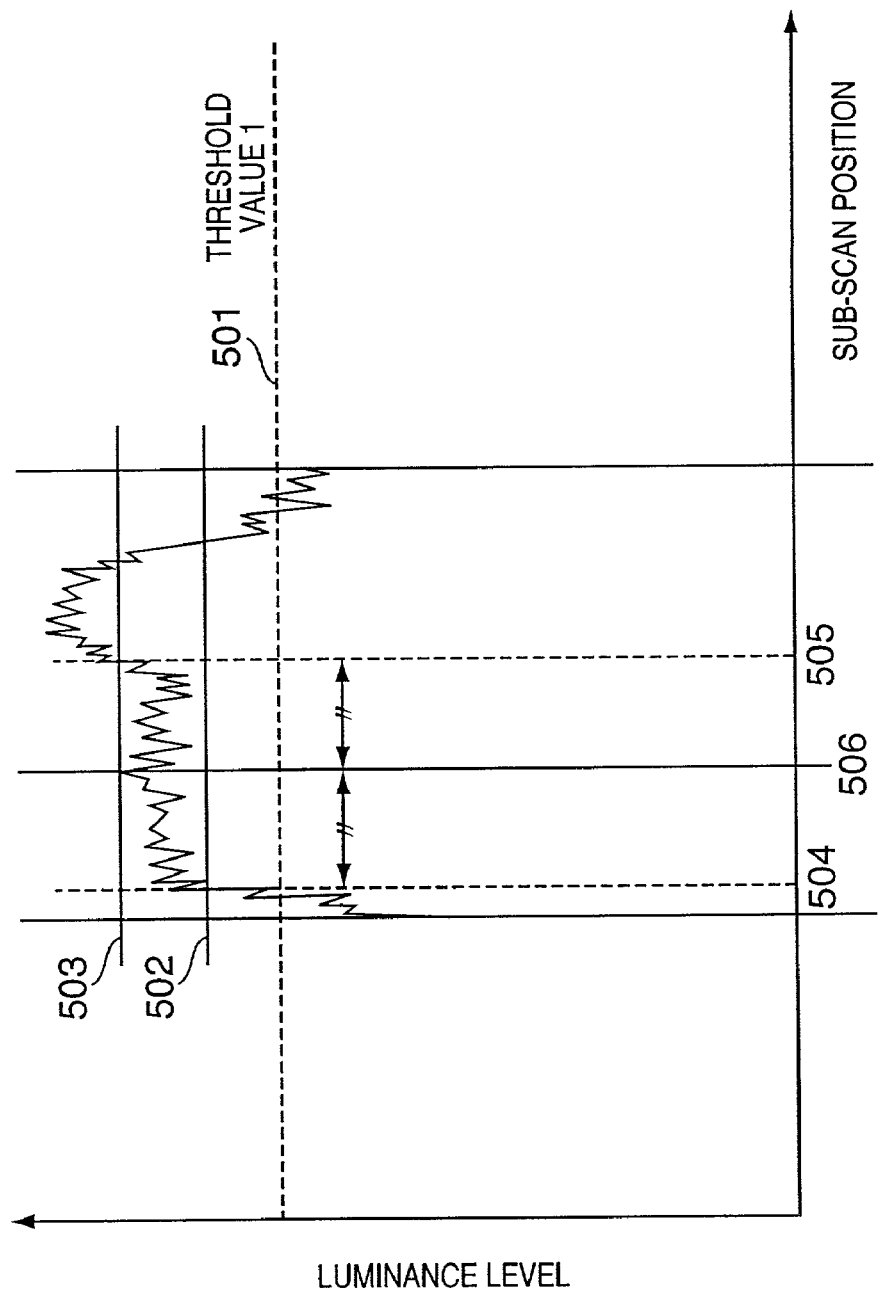
FIG. 5 is a diagram for explaining a reading position according to a second embodiment of the present invention.

In the first embodiment, the CCD 117, which detects the amount of light reflected when light is emitted from the light source toward the feed roller 103, and the document reader are moved back and forth, the amount of light reflected from the feed roller 103 is detected by the CCD 117 at each travelling position, the range in the sub-scan direction at which the detected value from the light-quantity detection means exceeds a predetermined threshold value is sensed and the center position of this range is set as the reading position. However, there are instances where a read signal of the kind shown in FIG. 5 is detected owing to difference in the diameter of the feed roller.

Figure 6:
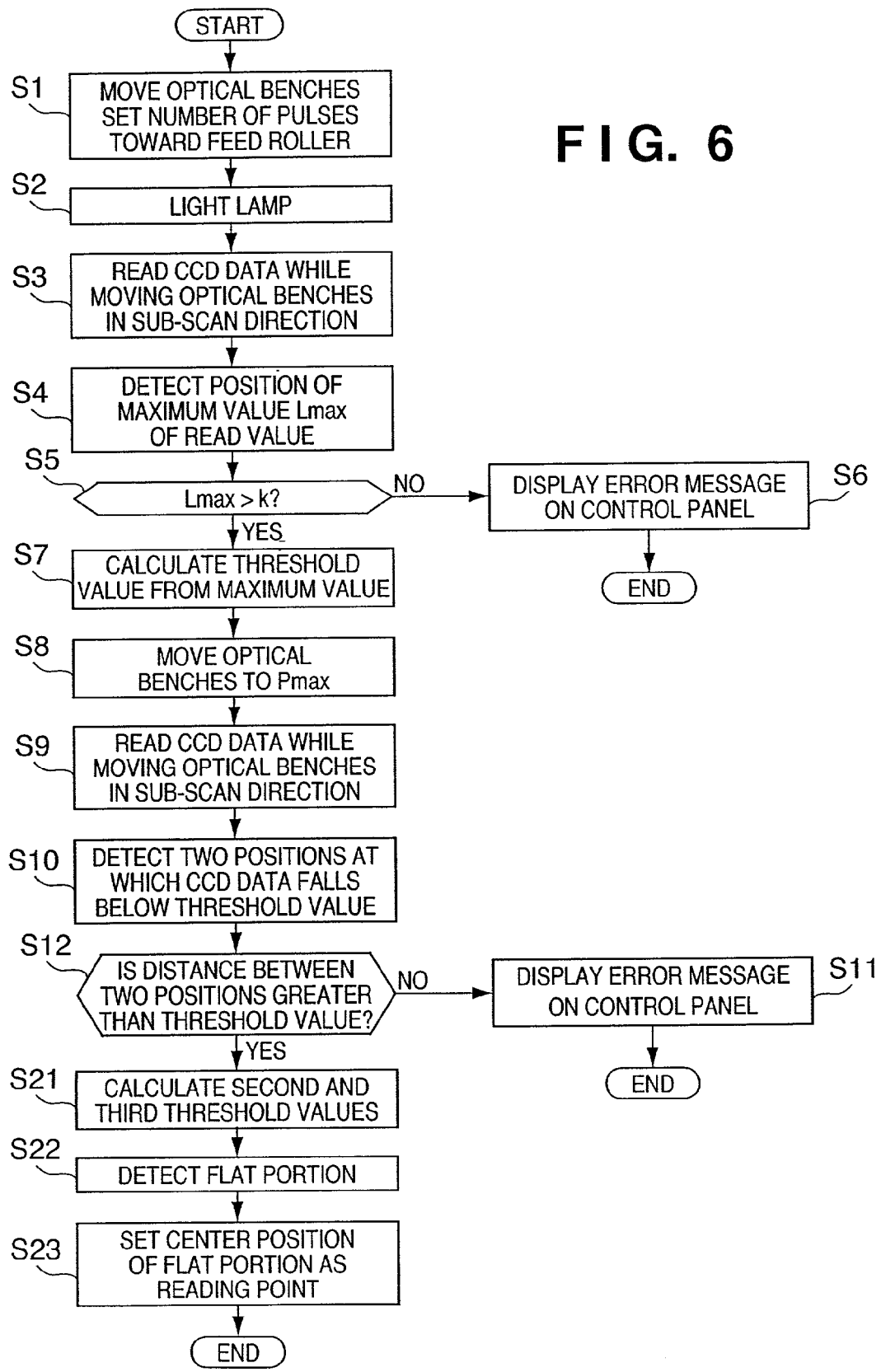
FIG. 6 is a flowchart illustrating processing for setting a reading position according to the second embodiment of the present invention.

FIG. 6 is a flowchart of processing in such case. If a signal of the kind shown in FIG. 5 is obtained at step S9, second and third threshold values 502, 503 are calculated at step S21 after execution of processing similar to that from step S1 to step S12 described in the first embodiment. A region (delimited by 504 and 505 in FIG. 5) in which the read signal is flat is detected (step S22) in a region in which the read signal is greater than a first threshold value 501 (which corresponds to the threshold value 201 in FIGS. 2A, 2B), and the center 506 of this region is set as the reading position (step S23). This makes it possible to obtain effects similar to those of the foregoing embodiment.

<Other Embodiment>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Figure 4:
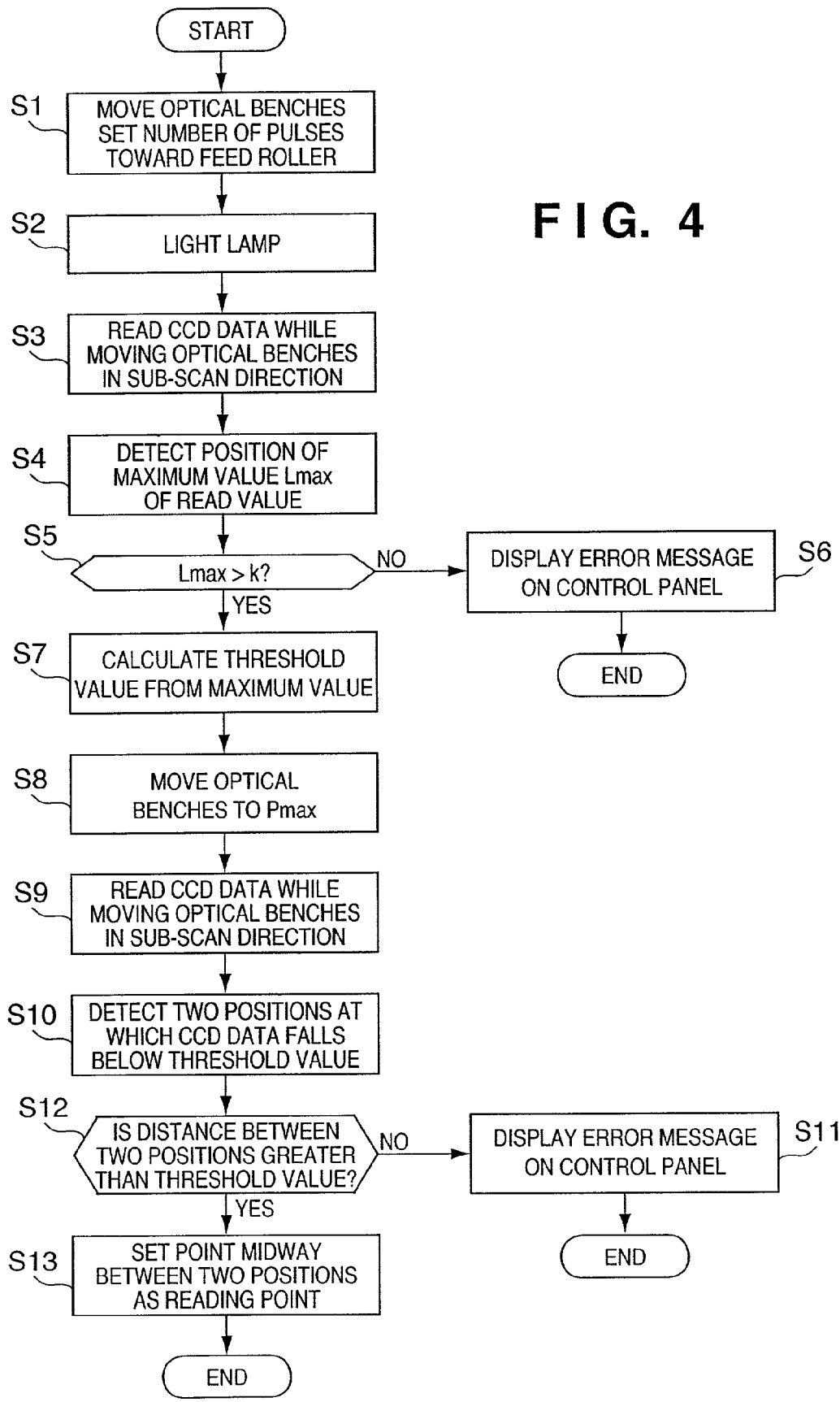
FIG. 4 is a flowchart illustrating processing for setting a reading position according to the first embodiment of the present invention.

In a case where the present invention is applied to the aforesaid storage medium, the storage medium stores program codes corresponding to the flowcharts shown in FIG. 4 or 6 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image reading apparatus for moving a document reading unit to a point below a document feeder that feeds documents, and emitting light from a light source of the document reading unit toward a feed roller of the document feeder, whereby light reflected from a document that travels between the feed roller and the light source is sensed by the document reading unit to thereby read an image on the document, said apparatus comprising:

a photoelectronic converter for outputting an electric signal that conforms to amount of incident light; and a reading position setting unit adapted to move the document reading unit, irradiate the feed roller with light from the light source at each position to which the document reading unit is moved, cause said photoelectronic converter to output an electric signal that conforms to amount of light reflected from the feed roller at each position, detect a range in a sub-scan direction over which this electric signal exceeds a predetermined threshold value, and set a position at the center of this range as a reading position.

2. The apparatus according to claim 1, wherein said reading position setting unit decides the threshold value based upon a maximum value of the electric signal output by said photoelectronic converter.

3. The apparatus according to claim 2, wherein said reading position setting unit adopts a value, which is obtained by multiplying the maximum value of the electric signal output by said photoelectronic converter by a predetermined coefficient, as the threshold value.

4. The apparatus according to claim 2, wherein said reading position setting unit decides the threshold value based upon the maximum value of the electric signal, which is output by said photoelectronic converter, when said maximum value is greater than a predetermined value.

5. The apparatus according to claim 4, wherein said reading position setting unit outputs an error signal when the maximum value of the electric signal output by said photoelectronic converter is equal to or less than the predetermined value.

6. The apparatus according to claim 1, wherein said reading position setting unit sets the reading position when the range in the sub-scan direction over which the predetermined threshold value is exceeded is broader than a predetermined range.

7. The apparatus according to claim 6, wherein said reading position setting unit outputs an error signal when the range in the sub-scan direction over which the predetermined threshold value is exceeded is narrower than the predetermined range.

8. The apparatus according to claim 1, wherein said reading position setting unit controls to perform a preprocessing of moving said document reading unit, causing the photoelectronic converter to output an electric signal at each position to which the document reading unit is moved, and detecting a position in the sub-scan direction that corresponds to the maximum value of this electric signal, and to execute processing for setting the reading position with regard to a predetermined range the center of which is the position in the sub-scan direction obtained in the preprocessing.

9. An image reading apparatus for moving a document reading unit to a point below a document feeder that feeds documents, and emitting light from a light source of the document reading unit toward a feed roller of the document feeder, whereby light reflected from a document that travels between the feed roller and the light source is sensed by the document reading unit to thereby read an image on the document, said apparatus comprising:
a photoelectronic converter for outputting an electric signal that conforms to amount of incident light; and
a reading position setting unit adapted to move the document reading unit, irradiating the feed roller with light from the light source at each position to which the document reading unit is moved, cause said photoelectronic converter to output an electric signal that conforms to amount of light reflected from the feed roller at each position, detect a range in a sub-scan direction over which this electric signal exceeds a predetermined threshold value, detect a flat portion of the read signal within this range, and set the center of the detected flat portion as a reading position.

10. The apparatus according to claim 9, wherein said reading position setting unit decides the threshold value based upon a maximum value of the electric signal output by said photoelectronic converter.

11. The apparatus according to claim 10, wherein said reading position setting unit adopts a value, which is obtained by multiplying the maximum value of the electric signal output by said photoelectronic converter by a predetermined coefficient, as the threshold value.

12. The apparatus according to claim 10, wherein said reading position setting unit decides the threshold value based upon the maximum value of the electric signal, which is output by said photoelectronic converter, when said maximum value is greater than a predetermined value.

13. The apparatus according to claim 12, wherein said reading position setting unit outputs an error signal when the maximum value of the electric signal output by said photoelectronic converter is equal to or less than the predetermined value.

14. The apparatus according to claim 9, wherein said reading position setting unit sets the reading position when the range in the sub-scan direction over which the predetermined threshold value is exceeded is broader than a predetermined range.

15. The apparatus according to claim 14, wherein said reading position setting unit outputs an error signal when the range in the sub-scan direction over which the predetermined threshold value is exceeded is narrower than the predetermined range.

16. The apparatus according to claim 9, wherein said reading position setting unit controls to perform a preprocessing of moving said document reading unit, causing the photoelectronic converter to output an electric signal at each position to which the document reading unit is moved, and detecting a position in the sub-scan direction that corresponds to the maximum value of this electric signal, and to execute processing for setting the reading position with regard to a predetermined range the center of which is the position in the sub-scan direction obtained in the preprocessing.

17. A reading position setting method in an image reading apparatus for moving a document reading unit to a point below a document feeder that feeds documents, and emitting light from a light source of the document reading unit toward a feed roller of the document feeder, whereby light reflected from a document that travels between the feed roller and the light source is converted to an electric signal by a photoelectronic converter to thereby read an image on the document, said method comprising:
a read-out step of moving the document reading unit, irradiating the feed roller with light from the light source at each position to which the document reading unit is moved and causing said photoelectronic converter to output an electric signal that conforms to amount of light reflected from the feed roller at each position;
a detection step of detecting a range in a sub-scan direction over which the electric signal exceeds a predetermined threshold value; and
a setting step of setting a position at the center of the range, which has been detected at said detection step, as a reading position.

18. The method according to claim 17, wherein the threshold value is decided based upon a maximum value of the electric signal output by the photoelectronic converter.

19. The method according to claim 18, wherein a value, which is obtained by multiplying the maximum value of the electric signal output by the photoelectronic converter by a predetermined coefficient, is adopted as the threshold value.

20. The method according to claim 18, wherein the threshold value is decided based upon the maximum value of the electric signal, which is output by the photoelectronic converter, when said maximum value is greater than a predetermined value.

21. The method according to claim 20, further comprising a step of outputting an error signal when the maximum value of the electric signal output by the photoelectronic converter is equal to or less than the predetermined value.

22. The method according to claim 17, wherein the reading position is set at said setting step when the range in the sub-scan direction over which the predetermined threshold value is exceeded is broader than a predetermined range.

23. The method according to claim 22, further comprising a step of outputting an error signal when the range in the sub-scan direction over which the predetermined threshold value is exceeded is narrower than the predetermined range.

24. The method according to claim 17, further comprising the following steps executed before said read-out step:
a step of moving said document reading unit and causing the photoelectronic converter to output an electric signal at each position to which the document reading unit is moved; and
a step of detecting a position in the sub-scan direction that corresponds to the maximum value of this electric signal;
wherein processing is executed at said read-out step with regard to a predetermined range the center of which is the obtained position in the sub-scan direction.

25. A reading position setting method in an image reading apparatus for moving a document reading unit to a point below a document feeder that feeds documents, and emitting light from a light source of the document reading unit toward a feed roller of the document feeder, whereby light reflected from a document that travels between the feed roller and the light source is converted to an electric signal by a photoelectronic converter to thereby read an image on the document, said method comprising:
a read-out step of moving the document reading unit, irradiating the feed roller with light from the light source at each position to which the document reading unit is moved and causing said photoelectronic converter to output an electric signal that conforms to amount of light reflected from the feed roller at each position;
a first detection step of detecting a range in a sub-scan direction over which the electric signal exceeds a predetermined threshold value;

a second detection step of detecting a flat portion of the read signal within the range detected at said first detection step; and a setting step of setting the center of the flat portion, which has been detected at said second detection step, as a reading position.

26. The method according to claim 25, wherein the threshold value is decided based upon a maximum value of the electric signal output by the photoelectronic converter.

27. The method according to claim 26, wherein a value, which is obtained by multiplying the maximum value of the electric signal output by the photoelectronic converter by a predetermined coefficient, is adopted as the threshold value.

28. The method according to claim 26, wherein the threshold value is decided based upon the maximum value of the electric signal, which is output by the photoelectronic converter, when said maximum value is greater than a predetermined value.

29. The method according to claim 28, further comprising a step of outputting an error signal when the maximum value of the electric signal output by the photoelectronic converter is equal to or less than the predetermined value.

30. The method according to claim 25, wherein the reading position is set at said setting step when the range in the sub-scan direction over which the predetermined threshold value is exceeded is broader than a predetermined range.

31. The method according to claim 30, further comprising a step of outputting an error signal when the range in the sub-scan direction over which the predetermined threshold value is exceeded is narrower than the predetermined range.

32. The method according to claim 25, further comprising the following steps executed before said read-out step:

a step of moving said document reading unit and causing the photoelectronic converter to output an electric signal at each position to which the document reading unit is moved; and a step of detecting a position in the sub-scan direction that corresponds to the maximum value of this electric signal;

wherein processing is executed at said read-out step with regard to a predetermined range the center of which is the obtained position in the sub-scan direction.

33. A computer program product comprising a computer-usable medium having computer-readable program code means embodied in said medium for a reading position setting method in an image reading apparatus for moving a document reading unit to a point below a document feeder that feeds documents, and emitting light from a light source of the document reading unit toward a feed roller of the document feeder, whereby light reflected from a document that travels between the feed roller and the light source is converted to an electric signal by a photoelectronic converter to thereby read an image on the document, said product including:

first computer-readable program code means for moving the document reading unit, irradiating the feed roller with light from the light source at each position to which the document reading unit is moved and causing said photoelectronic converter to output an electric signal that conforms to amount of light reflected from the feed roller at each position;

second computer-readable program code means for detecting a range in a sub-scan direction over which the electric signal exceeds a predetermined threshold value; and third computer-readable program code means for setting a position at the center of the detected range as a reading position.

34. A computer program product comprising a computer-usable medium having computer-readable program code means embodied in said medium for a reading position setting method in an image reading apparatus for moving a document reading unit to a point below a document feeder that feeds documents, and emitting light from a light source of the document reading unit toward a feed roller of the document feeder, whereby light reflected from a document that travels between the feed roller and the light source is converted to an electric signal by a photoelectronic converter to thereby read an image on the document, said product including:

first computer-readable program code means for moving the document reading unit, irradiating the feed roller with light from the light source at each position to which the document reading unit is moved and causing said photoelectronic converter to output an electric signal that conforms to amount of light reflected from the feed roller at each position;

second computer-readable program code means for detecting a range in a sub-scan direction over which the electric signal exceeds a predetermined threshold value;

third computer-readable program code means for detecting a flat portion of the read signal within the detected range; and fourth computer-readable program code means for setting the center of the detected flat portion as a reading position.

* * * * *